(12) United States Patent
Spata

(10) Patent No.: US 9,239,734 B2
(45) Date of Patent: Jan. 19, 2016

(54) SCHEDULING METHOD AND SYSTEM, COMPUTING GRID, AND CORRESPONDING COMPUTER-PROGRAM PRODUCT

(75) Inventor: Massimo Orazio Spata, Catania (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 813 days.

(21) Appl. No.: 13/517,530

(22) Filed: Jun. 13, 2012

(65) Prior Publication Data

US 2012/0315966 A1 Dec. 13, 2012

(30) Foreign Application Priority Data

Jun. 13, 2011 (IT) ................................ TO2011A0518

(51) Int. Cl.
*G06F 15/18* (2006.01)
*G06F 9/48* (2006.01)

(52) U.S. Cl.
CPC ..................................... *G06F 9/4881* (2013.01)

(58) Field of Classification Search
None
See application file for complete search history.

(56) References Cited

U.S. PATENT DOCUMENTS

| 7,590,589 | B2 * | 9/2009 | Hoffberg | 705/37 |
| 8,600,830 | B2 * | 12/2013 | Hoffberg | 705/26.3 |
| 8,671,409 | B2 * | 3/2014 | Spata | G06F 9/4881 718/102 |
| 8,874,477 | B2 * | 10/2014 | Hoffberg | 705/37 |
| 2008/0263557 | A1 * | 10/2008 | Spata | G06F 9/4881 718/104 |
| 2012/0315966 | A1 * | 12/2012 | Spata | G06F 9/4881 463/1 |
| 2014/0291152 | A1 * | 10/2014 | Conoci et al. | 204/450 |
| 2015/0140562 | A1 * | 5/2015 | Conoci et al. | 435/6.11 |
| 2015/0140563 | A1 * | 5/2015 | Conoci et al. | 435/6.11 |

OTHER PUBLICATIONS

Mapping mixed-criticality applications on multi-core architectures Giannopoulou, G.; Stoimenov, N.; Pengcheng Huang; Thiele, L. Design, Automation and Test in Europe Conference and Exhibition (Date), 2014 Year: 2014 pp. 1-6, DOI: 10.7873/DATE.2014.111 Referenced in: IEEE Conference Publications.*
Performance validation of dynamic-remapping-based task scheduling on 3D multi-core processors Chien-Hui Liao; Hung-Pin Wen VLSI Design, Automation, and Test (VLSI-DAT), 2012 International Symposium on Year: 2012 pp. 1-4, DOI: 10.1109/VLSI-DAT.2012.6212656 Referenced in: IEEE Conference Publications.*

(Continued)

*Primary Examiner* — Michael B Holmes
(74) *Attorney, Agent, or Firm* — Allen, Dyer, Doppelt, Milbrath & Gilchrist, P.A.

(57) ABSTRACT

An embodiment of a method for scheduling execution of jobs with the resources of a Multi-Core system envisages producing a system model based upon agents representing the jobs, said agents being able to implement a strategy for scheduling execution of the jobs with the resources of the Multi-Core system via respective available moves corresponding to the choice of a given resource of the Multi-Core system for execution of a given job. The agents are configured for implementing said strategy as strategy that integrates MiniMax and Nash-equilibrium strategies, for example operating in an iterative way, identifying an optimal solution deriving from the iteration. The strategy can be implemented by maximizing the probability of optimizing the time of completion of a given job for one of the agents.

21 Claims, 4 Drawing Sheets

(56) References Cited

OTHER PUBLICATIONS

Solving the Cardiac Model Using Multi-core CPU and Many Integrated Cores (MIC) Jing Yang; Jun Chai; Mei Wen; Nan Wu; Chunyuan Zhang High Performance Computing and Communications & 2013 IEEE Intl Conf on Embedded and Ubiquitous Computing (HPCC_EUC), 2013 IEEE 10th International Conference on pp. 1009-1015.*

Search report based on Italian application TO20110518, Ministero dello Sviluppo Economico, The Hague, Jan. 18, 2012, 2 pages.

Massimo Orazio Spata, Giuseppe Pappalardo, Salvatore Rinaudo, and Tonio Biondi: Agent-based negotiation techniques for a Grid: the Prophet Agents; Proceedings of the Second IEEE International Conference on e-Science and Grid Computing (e-Science'06), 2006; 6 pages.

Massimo Orazio Spata: A Nash-Equilibrium based Algorithm for Scheduling Jobs on a Grid Cluster; ST Microelectronics Dipartimento di Matematica e Informatica Università di Catania, Italy, pp. 2.

Massimo Orazio Spata, Salvatore Rinaudo: "A scheduling Algorithm based on Potential Game for a Cluster Grid", Journal of Convergence Information Technology vol. 4, No. 3, Sep. 2009, pp. 34-37.

Joel Wilkins, Ishfaq Ahmad, Hafiz Fahad Sheikh, Shujaat Faheem Khan, Saeed Rajput: "Optimizing Performance and Energy in Computational Grids using Non-Cooperative Game Theory", 2010 IEEE, pp. 13.

Wilkins, J.; Ahmad, I.; Fahad Sheikh, H.; Faheem Khan, S.; Rajput, S.: "Optimizing performance and energy in computational grids using non-cooperative game theory"; Green Computing Conference, 2010 International, Aug. 15-18, 2010, IEEE Xplore, http://ieeexplore.ieee.org/xpl/freeabs_all.jsp?arnumb.

Vytelingum, et al., "Agent-based Micro-Storage Management for the Smart Grid," University of Southampton, school of Electronics and Computer Science, Proc. of 9th Int. Conf. on Autonomous Agents and Multiagent Systems (AAMAS 2010), van der Hoek, Kaminka, Lespérance, Luck and Sen (eds.), May 10-14, 2010, Toronto, Canada, pp. 1-8.

Whitcroft, "Smart agents for smart grids: an application of game theory," http://sciblogs.co.nz/misc-ience/2010/05/12/smart-agents-for-smart-grids-an-application-of-game-theory/, May 12, 2010, pp. 1-4.

Greenbang, "Game theory: The secret to a clean-energy, smart-grid future?," May 5, 2010, pp. 1-2.

Vale et al., "Intelligent multi-player smart grid management considering distributed energy resources and demand response," Power and Energy Society General Meeting, 2010 IEEE Digital Object Identifier: 10.1109/PES.2010.5590170 Publication Year: 2010 , pp. 1-7.

Mohsenian-Rad, "Optimal and autonomous incentive-based energy consumption scheduling algorithm for smart grid," 2010 Digital Object Identifier: 10.1109/ISGT.2010.5434752 (2010), pp. 1-6.

Ibar, "Distributed Demand Management in Smart Grid with a Congestion Game," 2010 First IEEE International Conference on Digital Object Identifier: 10.1109/SMARTGRID.2010.5622091, (2010), pp. 495-500.

Basis of modern terminology knowledge 2010 shock / energy forum ed smart revolution: http://en.wikipedia.org/wiki/Smart_grid, original text Sep. 2, 2010 (this page was last modified on Jul. 24, 2015), pp. 1-49.

Ian Foster, "The Anatomy of the Grid: Enabling Scalable Virtual Organizations", First IEEE/ACM International Symposium on Cluster Computing and the Grid, May 2001, IEEE Conference Publications, pp. 6-7.

Amjad Mehmood, Abdul Ghafoor, H. Farooq Ahmed, and Zeeshan Iqbal, "Adaptive Transport Protocols in Multi Agent System", Fifth International Conference on Information Technology: New Generations, 2008, IEEE Conference Publications, pp. 720-725.

John F. Nash, "Equilibrium Points in n-Person Games", Proceedings of the National Academy of Sciences, vol. 36, No. 1, 1950, 3 pages.

JADE—Java Agent Development Framework; An Open Source Platform for Peer-to-Peer Agent Based Applications. Available at: http://jade.tilab.com.

Foundation for Intelligent Physical Agents, FIPA Agent Management Specification & Support for Mobility Specification, Geneva, Switzerland, Oct. 2000. Available at: http://www.fipa.org.

Sun Yan, and Li Cun-Lin, "The Minimax Principle of Non-cooperative Games with Fuzzy Payoffs", International Conference of Information Science and Management Engineering (ISME), 2010, IEEE Conference Publications, pp. 390-394.

Fioravante Patrone, "Decisori (Razionali) Interagenti", Una introduzione alla Teoria dei Giochi—Edizioni PLUS, Pisa, 2006, ISBN: 88-8492-350-6, pp. 5-12, and 46-47 English translation of the title: "Makers (Rational) Interacting", An Introduction to Game Theory—Plus editions, Pisa, 2006.

* cited by examiner

SCHEDULING METHOD AND SYSTEM, COMPUTING GRID, AND CORRESPONDING COMPUTER-PROGRAM PRODUCT

PRIORITY CLAIM

The instant application claims priority to Italian Patent Application No. TO2011A000518, filed Jun. 13, 2011, which application is incorporated herein by reference in its entirety.

TECHNICAL FIELD

An embodiment of the disclosure regards techniques for selective allocation (scheduling) of system resources, for example a Multi-Agent system, and has been devised with particular attention paid to its possible use in the field of Multi-Core architectures.

BACKGROUND

In the following, repeated mention will be made to bibliographical references. In order not to overburden the treatment, said references will be indicated in the body of the description with a number in square brackets (e.g., [x]) that identifies the reference within a "List of references" provided at the end of the description.

In the last few years there has been an evolution of computer systems, with the passage from the mainframe approach to the distributed client/server approach, up to computer networks. Said trend is linked to the increasing availability of fast and reliable microprocessors, produced in bulk and at a low cost.

In modern processing systems, the use of server computer networks is becoming widespread. Even in overloaded systems it may, however, happen that a significant percentage of the machines or servers included in the computer network are inactive or underloaded for a large part of the time.

A better use of the distributed computer environment can be obtained via implementation of selective-allocation or scheduling algorithms. A new paradigm of computational power is called a "grid". As a matter of fact, providing an integrated computing-grid environment makes it possible to give rise to computer infrastructures with high potential.

From a conceptual standpoint, a grid is simply a set of computer resources that perform jobs/threads assigned thereto. The grid is a distributed system of a heterogeneous type in terms of hardware and software (for example Operating Systems and applications). The grid appears to the users as a single large system that offers a single access point to distributed and powerful resources. The users treat the grid as a single computer resource. The grid accepts the tasks or jobs assigned by the users and allocates them selectively (i.e., schedules them) in view of their execution on suitable systems, included in the grid, on the basis of resource-management policies. The users can hence entrust to the grid tasks without having to be concerned about where these tasks will materially be executed.

Some main advantages linked to the use of a computing grid hence are:
  reduction of the hardware costs;
  computing server-workload balancing (via a load-management system);
  capacity of managing heterogeneous systems;
  increase in productivity; and
  reducing hardware obsolescence of the hardware.

In distributed systems, the tasks or jobs concur with one another in accessing the shared and distributed resources.

In this regard, at a conceptual level, one could consider the possibility for the users of the grid to implement an approach of manual booking of the grid resources. This approach would leave the choice and the estimation of the necessary resources up to the user of the grid, and this would inevitably imply risks of overestimation or underestimation of the resources following upon human error with consequent waste of the grid resources.

In addition, the users would have to estimate the right amount of hardware resources to reserve for that specific application (in terms of time of CPU and RAM usage). Finally, the user would have to know how to estimate the time of execution for that specific job [3].

Game Theory is a branch of economics and applied mathematics that analyzes the situations of conflict and seeks competitive and cooperative solutions via models in which different players choose the strategies to maximize their own gains or profits. The decisions of a subject can affect the results that can be achieved by a player according to a conjecture mechanism. The move, or set of moves, that a subject intends to make is called "strategy".

The applications and interactions of Game Theory are multiple: from the economic and financial field to the strategic-military field, from politics to sociology, from psychology to computer science, from biology to sport.

For example, in US 2008/263557 A1, which is incorporated by reference, a scheduler device is described for scheduling execution of jobs via the resources of a computing grid; said scheduler is configured for:
  identifying a threshold of equilibrium between resources and jobs;
  below the equilibrium threshold, scheduling execution of the jobs via the resources of the computing grid according to Pareto-optimal strategies; and
  above the equilibrium threshold, scheduling execution of the jobs via the grid-computing resources according to Nash-Equilibrium strategies.

Documents such as [2, 7] present scheduling algorithms based upon Nash Equilibrium designed to achieve the goal of maximizing the overall throughput in distributed systems. Specifically, document [2] discloses a Nash-Equilibrium-based algorithm for scheduling jobs on a grid cluster, and the results obtained thereby are compared with the results achieved with other allocation strategies such as MinMin, random, and "load balancing". In some situations, such as, for example, in the case of the "Prisoner's dilemma", the Nash-equilibrium solution is not, however, the Pareto-optimal solution [8, 9].

SUMMARY

In view of the foregoing analysis, there is a need for scheduling techniques (and hence schedulers) that are able to operate in an altogether automatic way and in conditions of transparency in regard to users in particular in order to reduce the inefficiency of current solutions.

An embodiment provides an answer to the needs outlined above. An embodiment is a method. An embodiment moreover regards a corresponding system, a Multi-Core system, that implements the method, as well as a computer-program product, which can be loaded into the memory of at least one computer and includes portions of software code that are able to implement the steps of the method when the product is run on at least one computer. As used herein, the reference to a such computer-program product is understood as being equivalent to the reference to a computer-readable means or medium containing instructions for control of the computer system in order to co-ordinate implementation of the method according to an embodiment. Reference to at least one computer is intended to highlight the possibility of an embodiment being implemented in a modular and/or distributed form.

Various embodiments can be based on a scheduling procedure based upon Game Theory and Nash Equilibrium applied to distributed systems, such as, for example, a computing grid or a Multi-Core system.

In various embodiments, on the basis of Game Theory, it is possible to implement a strategy that merges the MiniMax solution with the Nash-Equilibrium solutions.

An embodiment of the designed grid-schedule model is based on a job-scheduling game in which different tasks (or jobs or threads) concur as players for using the computing server. In various embodiments, each user can run a job choosing a single computing server (from among the n available) on which to execute the job. In various embodiments, the goal of each user of the grid may be to reduce total job-completion time, and maximizing the total system throughput.

In various embodiments, it is possible to pursue the goal of masking the hardware and software entropy implicit in a grid through the use of a Multi-Agent system.

As considered in the framework of the present description, Multi-Agent systems are a set of Agents (the term Agent is used herein in its current meaning in the world of computer networks and systems) located in a specific context and interacting through an adequate organization. An Agent is viewed as an entity that is characterized by being at least partially autonomous, such as a computer program, a robot, a human being, and so on.

An Agent system can be designed to create a transparent system of infrastructures in order to automate the process of presentation of the requests and to maximize the total throughput of the system.

An embodiment involves the use of an automatic grid middleware that synchronizes job scheduling on computing resources to automate concurrent access to those shared distributed resources. This automation process can be obtained via procedures that ensure a job-completion time by scheduling grid-job execution.

For example, a system based upon Agents has been tested on a Grid Cluster and has been used for simulating microelectronic devices through EDA (Electronic Design Automation) tools [1, 2, 7]. The JADE (Java Agent Development Framework) context has been used in middleware compliant with FIPA (Foundation for Intelligent Physical Agents) specifications and through a set of graphic tools that support the steps of development and debugging [4, 5].

Main designed-system entities envisaged in the architecture of the system are:
a jobInfo database, which is a MySQL database with information on the jobs,
an Interpreter Agent,
a MiniMax Agent,
a Nash Agent,
a Scheduler Agent, and
a procedure as considered herein.

BRIEF DESCRIPTION OF THE DRAWINGS

One or more embodiments will now be described, purely by way of non-limiting example, with reference to the annexed figures, wherein.

DETAILED DESCRIPTION

Figure 1:
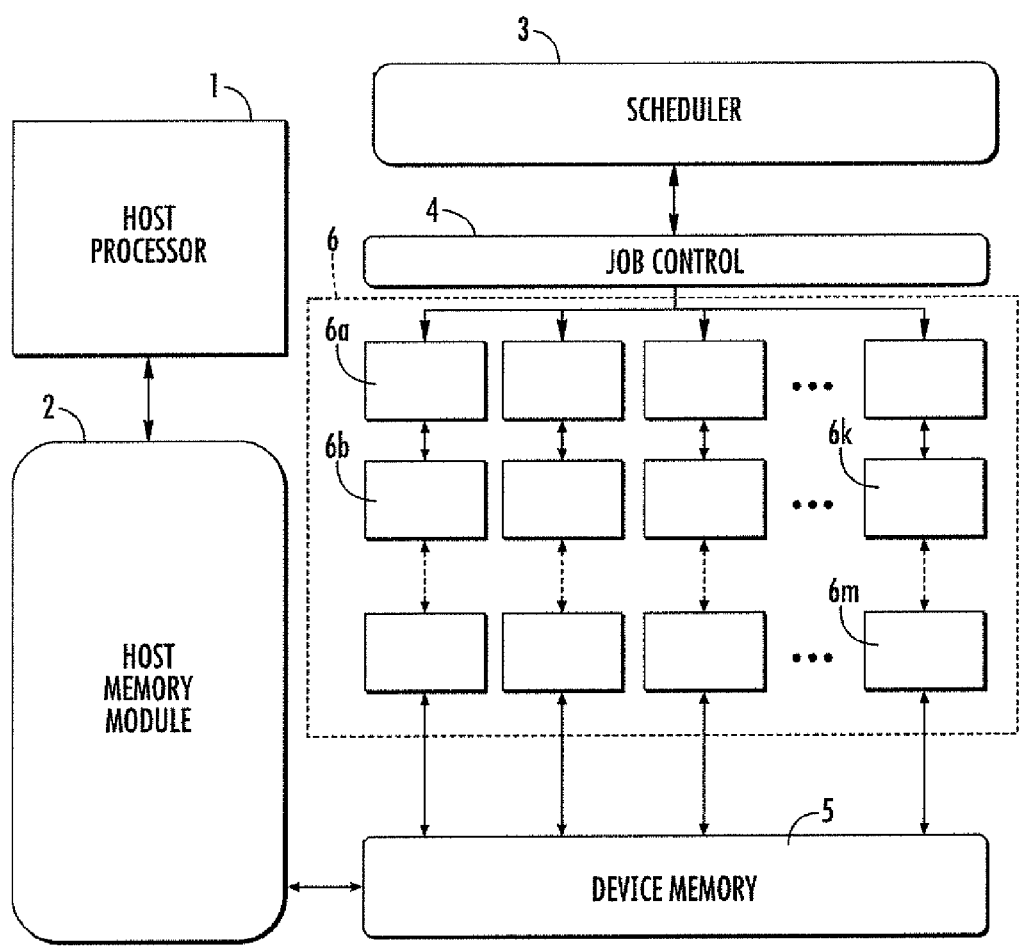
FIG. 1 shows a system with a Multi-Core architecture according to an embodiment.

In the ensuing description, various specific details are illustrated and aimed at providing an in-depth understanding of various embodiments. The various embodiments can be provided without one or more of the specific details, or with other methods, components, materials, etc. In other cases, known structures, materials, or operations are not shown or described in detail to prevent the various aspects of the embodiments from being obscured.

Reference to "an embodiment" or "one embodiment" in the framework of the present description is meant to indicate that a particular configuration, structure, or characteristic described in relation to the embodiment is included in at least one embodiment. Hence, phrases such as "in an embodiment" or "in one embodiment" that may be present in various points of the present description do not necessarily refer to one and the same embodiment. In addition, particular conformations, structures, or characteristics may be combined in any adequate way in one or more embodiments.

The references used herein are provided only for convenience, and, hence, do not define the sphere of protection or the scope of the embodiments.

By way of illustration of the principles underlying various embodiments, it should be recalled that a strategic game G with two players [8] can be defined in the form:

(X, Y, E, h)

where:

X, Y, E are sets,

X represents the choices available for Player I; the same applies to the set Y for Player II, E is a set of possible strategies for the game, h: X×Y→E; hence h is an output function that yields results obtained on the choices of the players and, if Player I chooses x and Player II chooses y, yields the result h(x, y).

In an embodiment of a game G, it is necessary to know the preferences of the players for the various elements of the set E.

A fast and simple way to describe these preferences is to use the utility functions u(x) [6, 7, 8]. For example, for Player I it is assumed that, given a function u defined in E and with values in R, $u(e') \geq u(e'')$ is to be interpreted as an expression of the fact that Player I prefers the result e' to the result e" [7, 8].

Hence, given a game (X, Y, E, h) and two utility functions (one for each of the players) ($u_1$, $u_2$), the expression of the game is the following:

(X, Y, E, h, $u_1$, $u_2$)

Through the composition operator "∘", we can define f1=$u_1$∘h and $f_2$=$u_2$∘h, obtaining a strategic game (X, Y, $f_1$, $f_2$) for two players, as defined in [8], where:

X, Y are sets of the choices available, and $f_1$, $f_2$ are functions X×Y→R.

A Nash equilibrium for the game G=(X, Y, $f_1$, $f_2$) is the pair of values (x*, y*) belonging to X×Y where:

$f_1$ (x*, y*)≥$f_1$ (x, y*) for every x belonging to X, and $f_2$ (x*, y*)≥$f_2$ (x*, y) for every y belonging to Y (see once again [8]).

In Game Theory, the "Prisoner's dilemma" is a type of non-cooperative game that can be expressed in an extended form via a decision tree, or in a strategic form via a matrix representation, and where each individual player (referred to as prisoner) has the goal of minimizing his own sentence (payoff) [6, 8].

In this type of game the effect of the preference relation (i.e., the choice of the i-th strategy) is that the players have an obvious strategy to apply, and this is a consequence of the presence of dominant strategies. The other effect of the gain is that the result of the strategic interaction is not efficient for that game [7, 8].

If we assume applying this model to a specific example and having m players equivalent to m jobs that are scheduled on t worker nodes WN:

the possible moves are equivalent to all the possible allocations of the jobs $j_1, j_2, \ldots, j_m$ on the t nodes $WN_1, WN_2, \ldots, WN_t$, the total number of moves available for each Agent is given by $t^m$, the gain in this model is equivalent to minimizing the time of completion of the job, optimizing the load [1], the set of the game matrices $M=\{M_1, \ldots, M_p\}$ with i=1, ..., p (with p equal to the total number of game matrices), a preference relation $>_i$ for maximizing the throughput: where a, b, c, d are parameters that represent the exponential average length of the queue of execution in the CPU at the first minute.

In this embodiment of computing-grid network, the players can correspond to the jobs, or vice versa. The set of strategies for each player is hence determined by the set of the initial loads for each computing server. Given a strategy for each player, the overall load on each machine is given by the sum of the times of completion of the jobs that choose that particular machine.

In a context such as the one considered herein by way of example, each player can try to minimize the overall time of completion of the job on a chosen machine. Thus, the standard target function can be that of reducing to a minimum the time of completion of the job on a worker node WN (and this target is called also minimization of a "makespan" type).

For example, given a game with two nodes $WN_1$ and $WN_2$ and two jobs $j_1$ and $j_2$ it is possible to define a matrix M in which the rows represent the strategies that the job $j_1$ can choose, and the columns represent the strategies that the job $j_2$ can choose. The table appearing below is a possible representation of a game matrix M in a strategic form for the "Prisoner's dilemma" problem with two Agents (jobs) $j_1$ and $j_2$ and two nodes ($WN_1$ and $WN_2$) and where in the case of the "Prisoner's dilemma" problem we have d>c>b>a.

M:

|  |  | $j_2$ | |
|---|---|---|---|
|  |  | $WN_1$ | $WN_2$ |
| $j_1$ | $WN_1$ | (c, c) | (a, d) |
|  | $WN_2$ | (d, a) | (b, b) |

In the case of the above game matrix, the Nash equilibrium can be calculated as follows:

a payoff is fixed for the Agent $j_1$; then, the second Agent $j_2$ moves on the rows to verify whether there exists a better strategy; otherwise, a payoff is fixed for the Agent $j_2$; then, the first Agent $j_1$ moves on the columns [2, 7].

In various embodiments, the procedure for calculation of the Nash equilibrium can be schematized as follows.

For each matrix M,
for each payoff vector,
compare the second component of each vector with all the other components by rows,
if it is not the minimum value, then it is not a Nash equilibrium,
otherwise, if it is the minimum value, take the first component of the vector and compare it with all the others by column,
if also this is the minimum, return this solution as Nash-equilibrium solution for the "Prisoner's dilemma" problem.

In other words, in the case just considered by way of example, each "Prisoner" Agent will make assumptions on the strategies of other Agents and will choose the best strategy for himself (i.e., the strategy with the highest gain value); making sure that any other Agent does not have other strategies with a higher gain, he will move over all the matrices and will follow the Nash-equilibrium solutions for the "Prisoner's dilemma" problem [8, 9].

Figure 4:
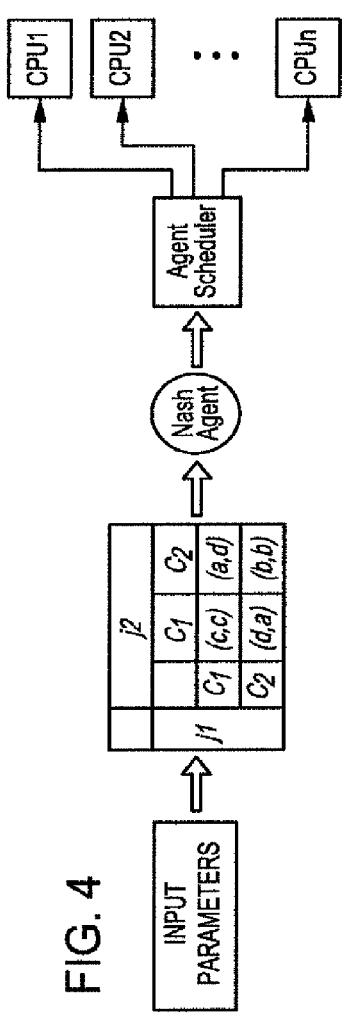
FIGS. 4 and 5 provide a comparison of different scheduling strategies.

FIG. 4 herein is schematically representative of scheduling of processing cores of a Multi-Core system (exemplified herein as a plurality of CPU's, namely CPU1, CPU2, ..., CPUn) implemented by a scheduler agent based on the results achieved by means of a Nash agent.

In Game Theory, MiniMax [10] is a strategy for minimizing the maximum loss possible, or, alternatively, for maximizing the minimum gain (MaxiMin). In zero-sum games, the MiniMax solution is the same as the Nash-equilibrium solution.

In the case considered by way of example, i.e., the "Prisoner's dilemma", we are in the presence of a non-zero-sum game; consequently, the MiniMax solution is not necessarily equivalent to the Nash-equilibrium solution.

Described in what follows is a possible form of implementation of a MiniMax procedure.

For each matrix M:
for each row of the matrix select the maximum values of each first component,
from among all the maximum values select the minimum value and return the row number for that value,
for each column of the matrix select the maximum values of each second component,
from among all the maximum values select the minimum value and return the column number for that value, and the row and column number defines the payoff vector that is the MiniMax solution for that matrix M for the "Prisoner's dilemma" problem.

Figure 5:
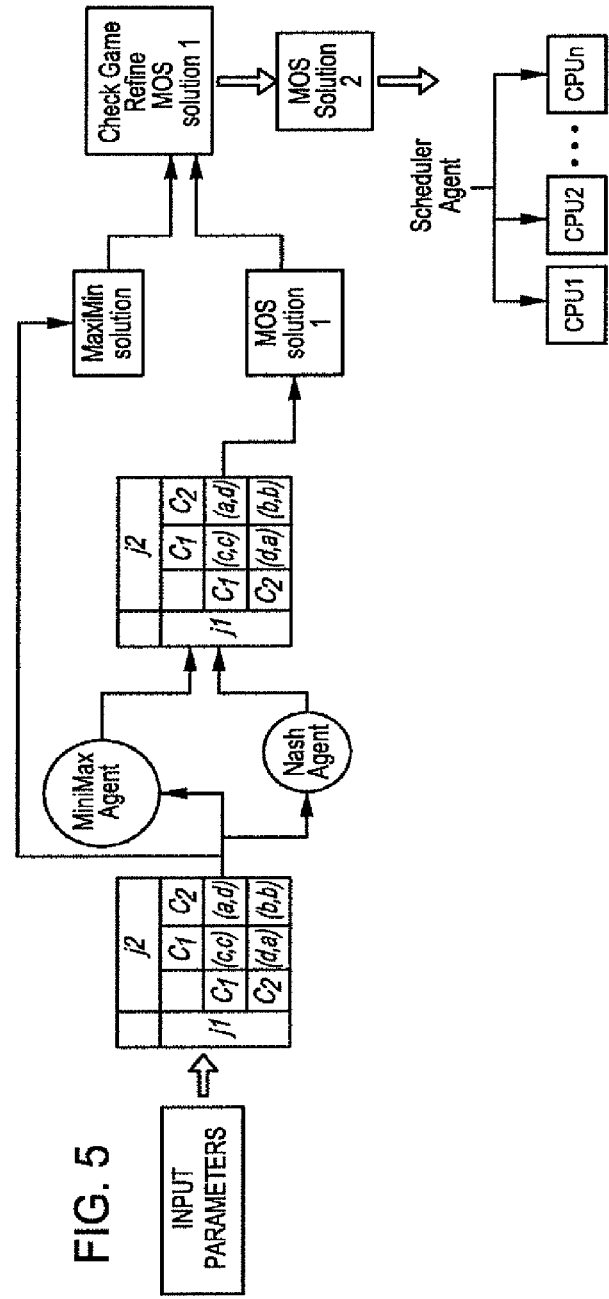

FIG. 5 herein is schematically representative of scheduling the tasks of processing cores in a Multi-Core system (again exemplified as a plurality of CPU's, namely CPU1, CPU2, ..., CPUn) based on agents representative of these tasks, where these agents are configured to implement a scheduling strategy as an integrated MiniMax/Nash Equilibrium strategy, with the possibility of optimizing (i.e., refining) the solution via a control game with a MaxiMin solution.

Described in what follows is a possible implementation of a procedure that integrates and merges the MiniMax solution with the Nash-equilibrium solutions.

For each matrix M:
calculate each Nash equilibrium and select the solutions through a Nash Agent,
if the Nash-equilibrium solution does not exist, then return the MiniMax solution for the initial game matrix,
calculate each MiniMax solution and select the solutions through a MiniMax Agent, play a new game between all the Nash and MiniMax Agents selected, for each Nash Agent compare its solution with a solution of a MiniMax Agent, if the parameters of the vector of the Nash Agent correspond to the parameters of the vector of the MiniMax Agent and there are no other solutions, return this solution, otherwise, for each Nash solution, and for each MiniMax solution iterate the "Prisoner's dilemma" problem, construct a new 2×2 matrix with the Nash solution in the first row and the MiniMax solution in the second row (both of the solutions supplied by the respective Agents), apply the Nash-equilibrium solution to the new matrix and return this solution, optimize the solution obtained, playing a new control game between the solution returned and the MaxiMin solution.

With reference to FIG. 1, a general embodiment of an architecture of a Multi-Core type will now be described.

An embodiment of a Multi-Core architecture can be viewed as a computing grid in which each Core node can be likened to a machine that can perform a different job.

From the hardware standpoint, a Multi-Core accelerator can present as an I/O unit, which communicates with the CPU via I/O commands and carries out direct transfers from/to the memory.

From the software standpoint, the Multi-Core accelerator can be another computer to which the procedure considered here can send data and jobs to be carried out.

The example of Multi-Core architecture of FIG. 1 has a memory module 5 of its own, called "device memory". As for the CPU, the time of access to the memory may be rather slow. The CPU can use cache memories (local memories) in order to try to reduce the memory-latency effect, putting recently accessed data in the cache memories, in order to allow future accesses to data in the cache memory.

The example of Multi-Core architecture considered herein further includes a Host processor module designated by the reference number 1 and a Host memory module designated by the reference number 2. The Host memory 2 is here exemplified as being in direct communication (DMA—Direct Memory Access) with the memory module 5. The DMA mechanism can enable certain hardware subsystems of a computer (for example, peripherals) to access directly the system memory for data exchange, or else read or write operations, without involving the CPU for each byte transferred via the usual interrupt mechanism and the subsequent request for the desired operation, but generating a single interrupt for the data block transferred.

In an embodiment, the jobs are executed in a synchronous or asynchronous way on the m Cores (designated as a whole by the reference number 6), and the procedure here considered is used to decide how to program the jobs thereon on the basis of a job-scheduling game. The corresponding software can hence be an Agent software, with the Agents that are the players of the job-scheduling game.

The scheduler block designated by the reference 3 can be basically a block on which the scheduling procedure described previously is executed, which enables optimization of the total throughput of the system on the basis of the jobs to be executed. This module can enable concurrent access to the general shared resources, as likewise the individual blocks Core 1, Core 2, . . . , Core m (indicated in the figure by the references 6a, 6b, . . . 6m).

The scheduler block 3 can interact with a job-control block 4, transmitting information on the allocation of the jobs and on the distribution of the latter to the various Core blocks 6a, 6b, 6m.

In various embodiments the overall Multi-Core architecture can behave as a parallel processor that has many Core modules, with the procedure that implements a parallel-programming model and the data parallelism. This hardware architecture can enable thousands of jobs to be executed simultaneously, in contrast with the general case of a single CPU in which there are only a few jobs being executed at the same time, and this considerably increases the computing capacity of the system.

Before defining the Agent model (the definition of which has been already introduced at the start of this document) used for implementing the Multi-Core system, described with a Sequence Diagram, it may prove useful to introduce a goal function used in the ensuing description.

Goal Function:
reduce to a minimum the total time of completion of jobs, maximizing the total throughput of the system [1, 2, 7],
send and receive information regarding the jobs requested,
calculate the complexity of the job to be executed, analyzing its previous input values,
calculate: initial loads, times of service $\lambda$ of the jobs, and times of inter-arrival $\mu$ of the jobs [1],
create the payoff matrix [1, 2],
find Nash equilibrium [2, 8, 9],
find the MiniMax solution,
compare the Nash, MiniMax, and MaxiMin solutions, and schedule the jobs on the Core C selected.

Quality Goal:
send calculated values to a Scheduler Agent.

Figure 2:
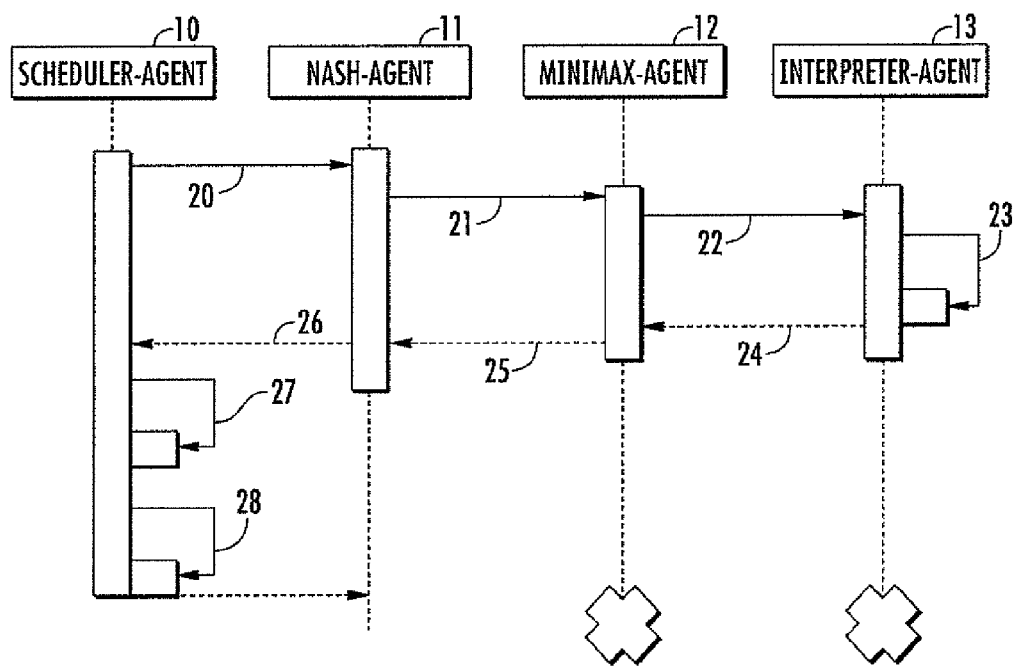
FIG. 2 illustrates a diagram of sequence of the interactions between the various Agents according to an embodiment.

FIG. 2 shows an example of possible embodiments of an architecture obtained with the Agent-modelling technique with Sequence Diagrams described through the UML language.

The example of architecture considered here can include a Scheduler-Agent block 10, a Nash-Agent block 11, a MiniMax-Agent block 12, and an Interpreter-Agent block 13.

The Nash Agent 11 is an Agent that can be instantiated for each job proposed, and is charged with analyzing all the possible Nash-equilibrium solutions. Its behavior can be defined by the class NashBehavior. The goal of the Nash Agent 11 is to analyze the payoff matrix for the jobs proposed. The Nash Agent 11 can invoke the start of a method of the class FindNashEquilibrium in order to find the Nash-equilibrium solution for a game in a strategic form such as, for example, the "Prisoner's dilemma" problem.

The MiniMax Agent 12 can be an Agent that is instantiated for each job proposed. The behavior of this Agent can be defined by the class MiniMaxBehavior. The goal of the MiniMax Agent 12 can be that of returning the MiniMax solution for the matrix M.

The goal of the Interpreter Agent 13 may be that of analyzing data input for each simulation job and sending it in response as a data-input value to the Nash Agent, which has requested it as data input. The behavior of the Agent can be defined by the class InterpreterBehavior.

The goal of the Scheduler Agent 10 may be that of scheduling the jobs on the most appropriate nodes WN, i.e., on the adequate Cores, following the correspondences indicated by the values of the solution obtained via the procedure considered here. The behavior of the Agent can be defined by the class SchedulerBehavior.

For each job a new Agent is instantiated, which can be seen as a player that participates actively in the job-scheduling game.

With reference to the example considered in FIG. 2, in a step 20 the Scheduler Agent 10 requests assignment of a worker node WN (or of a Core) to the Nash Agent 11. In a step 21, the Nash Agent 11 finds the Nash-equilibrium solution, whilst in a step 22, the MiniMax Agent 12 finds the MiniMax solution. The Interpreter Agent 13 analyzes the input referred to that given job and returns to the MiniMax Agent 12 the payoff parameters in a step 24. The MiniMax Agent 12 returns in a step 25 the MiniMax solution to the Nash Agent 11, and in a step 26 the Nash Agent 11 returns the Nash solution to the Scheduler Agent 10. The Scheduler Agent 10 compares in a step 27 the Nash and MiniMax solutions, refining this solution with MaxiMin, and finally, in a step 28, schedules the jobs on the Cores selected.

In a distributed system such as a Multi-Core system, one of the most important goals may be to optimize the load-balancing and total system throughput through a scheduler.

In general, finding a solution to the scheduling problems in multiprocessor systems is an np-complete problem (np—non-deterministic polynomial-time—and np-hard—non-deterministic polynomial-time hard); namely, it is not possible to find an efficient solution in a deterministic way in a polynomial limit time, which can instead be achieved with a heuristic model within an acceptable time.

For this reason, in various embodiments it is possible to model the scheduler as a job-scheduling game in which a number of jobs concur to use a number of worker nodes or Cores, as players of this game. Thus, for each job it is possible to choose a single processing Core for processing the job.

In Game Theory the Nash-equilibrium solution may be inefficient or may not exist, or even the Nash-equilibrium solution in a strategic game might not be unique.

Consequently, in order to solve this game problem, in various embodiments it is possible to integrate the Nash-equilibrium solutions with the MiniMax and MaxiMin solutions, via a system Agent in a new procedure. This can increase the Nash-equilibrium efficiency, iterating the strategic game. Thus, in various embodiments it is possible to use Mobile Agents in order to optimize the distribution of the workloads in a Multi-Core architecture. By "Mobile-Agent systems" is meant a set of autonomous software entities, located in a certain environment and interacting by means of an appropriate organization [4, 5].

By way of example, we may consider applying the procedure considered here to a specific example, assuming having n players equivalent to n jobs t that are to be scheduled on m Core nodes C. In this case considered as example:
- the possible moves are equivalent to all the possible assignments of the jobs $t_1, t_2, \ldots, t_n$ on the Core nodes $C_1, C_2, \ldots, C_m$,
- the total number of moves available for each Agent is given by $m^n$,
- the payoff is equivalent to minimizing the time of completion of the job, optimizing the total load of the system,
- the set of the game matrices is given by $M = \{M_1, \ldots, M_p\}$ with $i = 1, \ldots, p$ (where p is the total number of game matrices),
- a preference relation $>_i$ for reducing to a minimum the time of completion of a job, where a, b, c, d are parameters that represent at the first minute the average exponential length of the queue of execution of the jobs on the Core node.

In the example considered here, the players correspond to the jobs, and the set of strategies of each player is the initial load of each Core node.

Given a strategy for each player, the overall load on each Core node is the sum of the processing times of each job that chooses a given Core node. Each player can try to minimize the total time of completion of the job on the chosen Core node. Thus, the standard goal function can be reducing total job completion time on a selected Core using a makespan minimization.

Given a game with two Core nodes $C_1$ and $C_2$ and two jobs $t_1$ and $t_2$, in various embodiments it is possible to define a game matrix M, where the rows represent the strategies that the job $t_1$ can choose, and the columns represent the strategies that the job $t_2$ can choose.

The following table is an example of a simple game matrix M, for a game expressed in the strategic form, such as for example the "Prisoner's dilemma" problem, with two Agents (jobs $t_1$ and $t_2$) and two Core nodes ($C_1$ and $C_2$):

M:

|  |  | $t_2$ | |
|---|---|---|---|
|  |  | $C_1$ | $C_2$ |
| $t_1$ | $C_1$ | (c, c) | (a, d) |
|  | $C_2$ | (d, a) | (b, b) | where, in the case of the "Prisoner's dilemma" for example we have d>c>b>a.

In the case of the aforesaid game matrix M, the Nash equilibrium can be calculated as follows: fix payoff for the Agent $t_1$; then the second Agent $t_2$ moves on the rows to verify whether there exists a better strategy; otherwise, fix payoff for the Agent $t_2$; then, the first Agent $t_1$ moves on the columns.

In other words, according to said example, each Nash Agent can make assumptions on the strategies of the other Agents and make the best choice (i.e., the one with the highest gain value) for itself, so that every other Agent does not have other strategies with higher gain, moving throughout the matrix and following the Nash-equilibrium solutions for the "Prisoner's dilemma" problem.

In the example considered here, for each game matrix M the MiniMax Agent will compute the MiniMax solution, as described in what follows:
—For each matrix M
  For each row of the matrix obtain the maximum values of each first component.
  From among all the maximum values obtain the minimum value and return the row number for that value.
  For each column of the matrix obtain the maximum values of each second component.
  From among all the maximum values obtain the minimum value and return the column number for that value.

The row and column number define the payoff vector that is the MiniMax solution of the "Prisoner's dilemma" problem for that matrix M.

Figure 3:
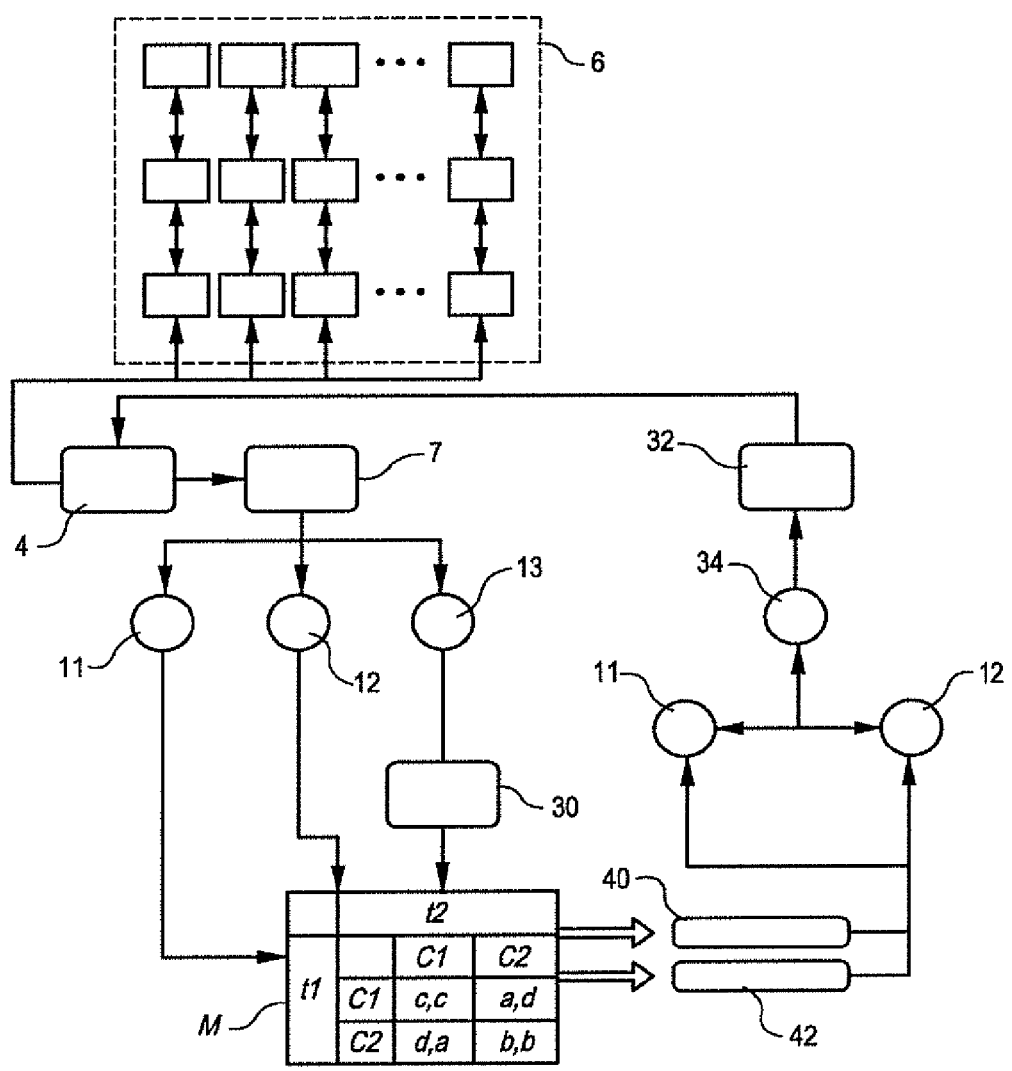
FIG. 3 illustrates a specific implementation of an embodiment.

The Nash Agent and the MiniMax Agent can be used by the procedure considered here for playing the job-scheduling game and deciding how to distribute the jobs on the Cores as illustrated in FIG. 3.

In the example considered here, the job-control block 4 communicates with a block 7 that is to send the working requests to the Nash Agent 11, the MiniMax Agent 12, and the Interpreter Agent 13; the Agents have available the game matrix M, and in a step 30 the Interpreter Agent 13 analyzes the jobs and the data at input to create and return a parameter vector.

Starting from the matrix M, it is possible to calculate a first solution 40 (via the Nash Agent) and a second solution 42 (via the MiniMax Agent), which are sent to the two blocks 11 (Nash Agent) and 12 (MiniMax Agent). In a step 34, it is possible to calculate the solution according to the procedure considered here and find the final solution by optimizing the solution previously found.

In the example considered here, in step 34 a new control game is possibly played between the solution returned and the MaxiMin solution. Finally, in a step 32, the jobs are scheduled on the Core nodes suggested by the solution calculated in step 34.

The following is an example of an embodiment of the above-described MOS algorithm where there are two jobs and two computer cores capable of performing the jobs.

The Prisoner's Dilemma

Per above, in the game theory, the Prisoner's Dilemma is a type of non-cooperative game where the only concern of each individual player ("the prisoner") is to maximize his own payoff, without any concern for the other player's payoff [11].

In this type of game the preference relation effect $>_i$ is that players have an obvious strategy to apply, and this is consequent to the presence of dominant strategies. The other effect of payoff is that the result of strategic interaction is non-efficient for this game [12, 13, 14].

Model of Agent Payoff

Apply this model to a specific example and suppose having m=2 players' equivalent to 2 jobs that must be scheduled on c=2 CPUs:

Possible moves are equivalent to all possible job allocations $j_1, j_2$ on $c_1, c_2$
  a. Total available moves number for every agent is given by $2^2=4$
  b. Payoff in our model is equivalent to minimizing job completion time, optimizing load
  c. Game Matrix M={$M_1, M_2$}
  d. A preference relation $>_i$ to maximize throughput: a,b,c,d are parameters representing the 1-minute exponentially average CPU run queue length.

Briefly, players correspond to jobs. The strategy set of each player is the set of initial load for every CPUs. Given a strategy for each player, the total load on each CPU is given by the sum of processing times of the jobs that choose that CPU.

Usually each player seeks to minimize the total job completion time on its chosen CPU. So, standard objective function is minimizing the job completion time on one loaded CPU c and this objective is called makespan minimization.

For example: given game with 2 CPUs $c_1$ and $c_2$ and 2 jobs $j_1$ and $j_2$. The rows represent the strategies job $j_1$ can choose and the columns represent the strategies job $j_2$ can choose. The following table is a simple Game Matrix M for the Prisoner's Dilemma problem for 2 agents (jobs) and 2 CPUs ($c_1$ and $c_2$):

M:

|  |  | $j_2$ | |
|---|---|---|---|
|  |  | $c_1$ | $c_2$ |
| $j_1$ | $c_1$ | (c, c) | (a, d) |
|  | $c_2$ | (d, a) | (b, b) |

Where, for example, in the case of the Prisoner's Dilemma problem is: d>c>b>a.

On the above Game Matrix, Nash Equilibrium will be calculated as follows: fixed payoff for agents' $j_1$ then the second agent $j_2$ moves itself on the rows to verify if a better strategy exists, vice versa fixed payoff for agents' $j_2$ then the first agent $j_1$ moves itself on the columns [11].

Nash Equilibrium Algorithm
  a. For every Matrix M,
  b. For every payoff array
  c. Compare, the second component of each array with all the other components per line,
  d. If it is not minimum value then it is not a Nash Equilibrium,
  e. Else if it is the minimum, then take the first component of that array and compare to all other per column,
  f. If it is the minimum too, then return this Nash Equilibrium solution for the Prisoner's Dilemma problem In other words, every Nash Agent will do conjectures about other agents' strategies and make the best choice (with the highest profit value) for him, ensure that every other agent does not have other strategies with the highest profit, move on all matrixes and follow Nash Equilibrium solutions for Prisoner's Dilemma problem.

MiniMax Algorithm

In Game Theory the MiniMax is a strategy to minimize the maximum possible loss, or alternatively, to maximize the minimum gain (MaxiMin). In zero-sum games, the MiniMax solution is the same as the Nash Equilibrium.

In the case under study, the Prisoners' Dilemma Game is a non-zero-sum game, so MiniMax Solution, is not necessarily equivalent to Nash Equilibrium Solution.

Follow the implemented MiniMax, MaxiMin and MOS algorithm:

MiniMax Algorithm
  a. For every Matrix M
  b. For every line of the matrix get maximum values of any first component
  c. Between every maximum values get the minimum value and return the line number for that value
  d. For every column of the matrix get maximum values of any second component
  e. Between every maximum values get the minimum value and return the column number for that value
  f. The number of line and column define the payoff array which is the MiniMax solution for that matrix M of the Prisoner's Dilemma problem.

MaxiMin Algorithm
  a. For every Matrix M
  b. For every line of the matrix get minimum values of any first component
  c. Between every minimum values get the maximum value and return the line number for that value
  d. For every column of the matrix get minimum values of any second component
  e. Between every minimum values get the maximum value and return the column number for that value
  f. The number of line and column define the payoff array which is the MaxiMin solution for that matrix M of the Prisoner's Dilemma problem.

MOS Algorithm
For Every Matrix M
  a. Calculate every Nash Equilibrium and select the solutions through Nash Agent
  b. If Nash Equilibrium solution not exists then return MiniMax solution for the initial game matrix c. Calculate every MiniMax and select the solutions through MiniMax Agent
d. Play a new Game between all the selected Nash and MiniMax Agents.
e. For every Nash Agent compare his solution with a MiniMax Agent solution
f. If the Nash Agent array parameters correspond to the MiniMax Agent array parameters and there are not any other solutions then return this solution
g. Else for every Nash solution, and for every MiniMax (MaxiMin) solution iterate the Prisoner's Dilemma problem, building a new 2×2 matrix with Nash solution in the first line and MiniMax solution in the second line (both solutions provided by respective Agents)
h. Apply Nash Equilibrium solution to the new Matrix and return this solution.
i. Refine obtained solution, playing a new check Game between the returned solution and MaxiMin solution.
j. Iterate the Game G between all the Nash, MiniMax and MaxiMin solutions until there will be a unique solution, applying step ii.

As explained in the above MOS algorithm (step ii), if there are more than one MiniMax or Nash solutions, than the game will be iterated building new matrix, where for example in the first line there is Nash Solution and in the second line the MiniMax solution.

So, moreover searching for Nash, MiniMax or MaxiMin solution is equivalent to apply the above algorithm to initial Game Matrix M, instead selecting solutions found by means of Nash, MiniMax, and MaxiMin Agents, is equivalent to compare all the solutions, iterating the Game as above explained in new 2×2 Matrixes, one for every couple of Nash, MiniMax, and MaxiMin solutions.

For example, let it be M:
M:

|  |  | $j_2$ | |
|---|---|---|---|
|  |  | $c_1$ | $c_2$ |
| $j_1$ | $c_1$ | (6, 6) | (0, 7) |
|  | $c_2$ | (7, 0) | (1, 1) |

Suppose the preference relation is $<_i$.

Here the Nash solution is (6,6), the MiniMax solution is (6,6). When Nash and MiniMax is equal, so as explained in step i. if there is not a MaxiMin solution than the solution is Nash solution (6,6). But in this example the MaxiMin solution exist and it is equivalent to (1, 1). So iterate the game and play, building a new 2×2 matrix M, with Nash in the first line and MaxiMin in the second line:
M:

|  |  | $j_2$ | |
|---|---|---|---|
|  |  | $c_1$ | $c_2$ |
| $j_1$ | $c_1$ | (6, 6) | (6, 6) |
|  | $c_2$ | (1, 1) | (1, 1) |

Applying the Nash Equilibrium (1,1) is the final MOS solution, and it is the real Pareto optimal solution.

In order to further test the possible applications of embodiments, test have been conducted referring, by way of example, to a Smart Grid for distribution of electricity. Such a Smart Grid has available smart monitoring tools for keeping track of all the electrical flows of the system, and likewise tools for integrating the renewable energies in the network.

The scenario of the energy future that Smart Grids allow us to imagine is that one day our houses will be coupled to a smart network that manages the electrical energy with maximum efficiency and the minimum cost, with clean and renewable energy sources such as wind and solar sources. The users may possibly contribute to generating their own energy through solar panels or wind-energy turbines of small size and using the energy stored for recharging, for example, the batteries of electric automobiles.

Such an approach may be subject to certain evident limits. For example, it makes sense that a user can decide to charge his own electric car outside peak hours, i.e., when energy costs are lower. But in practice, if everybody were to act to according this strategy and were to make the same decision, then the result would be a peak in the energy demand outside of peak hours.

On the other hand, if all the users were to act following the same strategy and were to make available the energy in the Smart Grid during the peak periods of demand, the results could be a higher initial gain, which would then result in a surplus of supply and in a low level of demand, and consequently a lower gain and an increase of the prices of electricity.

It is consequently desirable to find a balance between demand and supply among all the users or players of the Smart Grids, by adopting a non-cooperative-game approach.

The approach could be to find a solution to balance the game by applying Nash-equilibrium theory. However, as has already been seen at the start of the present description, Nash equilibrium in some cases may prove inefficient (or suboptimal), may not be unique, or may even not exist.

In a possible embodiment, a Smart Grid can be understood as an electrical-power plant that can envisage millions of sensors coupled together by an advanced communication and data-acquisition system. This system provides a real-time analysis through a distributed computing system that enables a predictive response, rather than a reactive response, to the inputs of said system.

Hence, for what is of interest here, we can imagine the electrical system as an energy market in which all the players are the users, or Agents of the system, who play for buying or selling energy.

An embodiment exemplified here envisages application on a Multi-Agent system of the procedure considered here for the game in a strategic form with the so-called Folk Theorem.

As is known, according to this theorem of Game Theory, if the MiniMax conditions are satisfied, in the case of games repeated infinitely, it is possible to determine a link between what happens in a certain period and what can happen in the future, showing that a non-optimal behavior in the short term may become optimal in the long term, and consequently it is possible to obtain equilibrium payoffs that are efficient.

In this perspective, considering the capacity of the competitors to "punish" a deviant behavior practiced in the past, it is extremely probable for there to be an infinite number of solutions.

Tests conducted have shown that an embodiment is able to calculate dynamically Pareto-optimal load conditions, thus increasing the total throughput of the jobs, with variable loads and with different job/CPU node ratios. The results obtained by application of this procedure on samples of 250 matrices of parameters has produced an average improvement of efficiency of from 76% to 88%.

A main target achieved is the significant drop of inefficiency as compared to MiniMax and Nash-equilibrium solutions.

An embodiment can be applied in general to all Smart Grid systems. Using various embodiments it is possible to forecast the behavior of a general distributed system, such as a Smart Grid, given that each Agent behaves rationally and reacts only to a price signal, and build a system based upon Agent strategies, which can obtain, for example, (once again with reference to the example just considered) the best profile of energy accumulation given the variable market prices.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

LIST OF THE REFERENCES

[1] Massimo Orazio Spata, Giuseppe Pappalardo, Salvatore Rinaudo, Tonio Biondi: "Agent-Based Negotiation Techniques for a Grid: The Prophet Agents", e-Science 2006, 149.
[2] Massimo Orazio Spata: "A Nash-Equilibrium Based Algorithm for Scheduling Jobs on a Grid Cluster", WET-ICE 2007: 251-252.
[3] I. Foster, C. Kesselman, and S. Tuecke: "The Anatomy of the Grid: Enabling Scalable Virtual Organization", International Journal of High Performance Computing Applications, 15(3):200-222, 2001.
[4] WWW. JADE a Java Agent Development Framework http://jade.tilab.com/
[5] Foundation for Intelligent Physical Agents, FIPA Agent Management Specification & Support for Mobility Specification, Geneva, Switzerland, October 2000. Available at: http://www.fipa.org
[6] Amjad Mehmood, Abdul Ghafoor, H. Farooq Ahmed, Zeeshan Iqbal: "Adaptive Transport Protocols in Multi Agent System", pp. 720-725, Fifth International Conference on Information Technology: New Generations (itng 2008), 2008
[7] Massimo Orazio Spata, Salvatore Rinaudo: "A scheduling Algorithm based on Potential Game for a Cluster Grid" JCIT Journal of Convergence Information Technology, (2009)
[8] F. Patrone (Author) "Decisori razionali interagenti", pp. 5-12, 46, Una introduzione alla Teoria dei Giochi—Edizioni PLUS, Pisa, 2006 ISBN: 88-8492-350-6
[9] John Nash, "Equilibrium points in n-person games", 48-49, Proceedings of the National Academy of Sciences, 36, 1950
[10] Sun Yan, Li Cun-lin, "The Minimax Principle of Non-cooperative Games with Fuzzy Payoffs" International Conference of Information Science and Management Engineering (ISME), 2010 Publication Year: 2010, Page(s): 390-394

The above-listed references are incorporated by reference.

Of course, without prejudice to the principles of the disclosure, the details of implementation and the embodiments may vary, even significantly, with respect to what has been illustrated herein purely by way of non-limiting example, without thereby departing from the scope of the disclosure.

The invention claimed is:

1. A method for scheduling the performance of tasks using resources of a Multi-Core system, the method including:
producing a system model based on agents representative of said tasks, said agents configured to implement a scheduling strategy of performing said tasks with the resources of the Multi-Core system via respective available moves corresponding to the choice of a given resource of the Multi-Core system to perform a given task and
wherein said agents are configured to implement said strategy as an integrated MiniMax/Nash Equilibrium strategy.

2. The method of claim 1, wherein said agents are configured to implement in an iterative manner MiniMax and Nash Equilibrium strategies, by identifying an optimal solution deriving from iteration.

3. The method of claim 1, wherein said strategy is implemented by maximizing a probability of optimizing a time of completing a given task for one of said agents.

4. The method of claim 1, including:
identifying for each agent a set of strategies determined by a set of an initial workload on each resource in the Multi-Core system; and
defining a total load on each resource as a sum of performance times of the tasks that select said resource.

5. The method of claim 1, including optimizing results of said integrated MiniMax/Nash Equilibrium strategy with a control game with a MaxiMin solution.

6. The method of claim 1, including:
searching Nash Equilibrium solutions within said system model, selecting the solutions found by a Nash Agent,
in the absence of Nash Equilibrium solutions returning the MiniMax solution for an initial game matrix,
searching MiniMax solutions within said system model, selecting the solutions found by a MiniMax Agent,
playing a new game among all the Agents selected with the Nash and MiniMax solutions found,
for each Nash Agent, comparing its respective solution with a solution of a MiniMax Agent,
if the parameters of the Nash Agent vector correspond to the parameters of the MiniMax Agent vector, and no other solutions exist, returning this solution,
otherwise, for each Nash solution and for each MiniMax solution, iterating the Prisoner's Dilemma problem, generating a new 2×2 matrix with the Nash solution in the first line and the MiniMax solution in the second line,
applying the Nash Equilibrium solution to the new matrix and returning this solution,
optimizing the solution obtained, by playing a new control game between the solution returned and the MaxiMin solution.

7. A scheduler device configured to implement the method of claim 1.

8. A computing grid including a plurality of resources to perform computing tasks, said computing grid including a scheduler according to claim 7.

9. A computer program product, loadable in the memory of at least one computer and including software code portions configured to perform the method of claim 1.

10. An apparatus, comprising:
a first analyzer configured to identify at least one possible first configuration of system nodes according to a first game-theory algorithm;
a second analyzer configured to identify at least one possible second configuration of the system nodes according to a second game-theory algorithm; and a configuration determiner configured to determine a resulting configuration of the system nodes in response to the identified at least one first and second configurations.

11. The apparatus of claim 10 wherein the system nodes include processing nodes of a computer system; and the at least one first, at least one second, and resulting configurations include respective assignments of processing tasks to the processing nodes.

12. The apparatus of claim 10 wherein the system nodes include a power-generating node and a power-consuming node of a power grid; and the at least one first, at least one second, and resulting configurations include respective assignments of a power-generating level to the power-generating node and of a power-consuming level to the power-consuming node.

13. The apparatus of claim 10 wherein one of the first and second gain-theory algorithms includes a Nash-Equilibrium algorithm.

14. The apparatus of claim 10 wherein one of the first and second gain-theory algorithms includes a MiniMax algorithm.

15. The apparatus of claim 10 wherein:
the first analyzer is configured to identify the at least one first configuration of the system nodes as at least one Nash Equilibrium solution;
the second analyzer is configured to identify the at least one second configuration of the system nodes as at least one MiniMax solution; and
the configuration determiner is configured to determine the resulting configuration by
setting the resulting configuration equal to one of the at least one MiniMax solutions if the first analyzer yields no Nash Equilibrium solution, and
if the first analyzer yields at least one Nash Equilibrium solution, then comparing each of the at least one Nash Equilibrium solutions to each of the at least one MiniMax solutions,
if each of the at least one Nash Equilibrium solutions equals a respective one of the at least one MiniMax solutions, and no other solutions exist, then setting the resulting configuration equal to one of the at least one existing solutions,
else, for each respective Nash Equilibrium solution and for each respective MiniMax solution
generating a matrix with the respective Nash Equilibrium solution the respective MiniMax solution,
applying the Nash Equilibrium algorithm to the matrix and returning a resulting solution if a resulting solution exists, and
if the resulting solution exists, then
optimizing the resulting solution according to a MaxiMin algorithm, and
setting the resulting configuration equal to the resulting solution.

16. A system, comprising:
nodes; and
an apparatus, including
a first analyzer configured to identify at least one possible first configuration of the nodes according to a first game-theory algorithm;
a second analyzer configured to identify at least one possible second configuration of the nodes according to a second game-theory algorithm; and
a configuration determiner configured to determine a resulting configuration of the nodes in response to the identified at least one first and second configurations.

17. The system of claim 16 wherein the nodes include data-processing nodes; and the at least one first, at least one second, and resulting configurations include respective data to be processed by the data-processing nodes.

18. The system of claim 16 wherein the nodes include a power-generating node and a power-consuming node; and the at least one first, at least one second, and resulting configurations include respective assignments of a power-generating level to the power-generating node and of a power-consuming level to the power-consuming node.

19. A method, comprising:
identifying at least one possible first configuration of system nodes according to a first game-theory algorithm;
identifying at least one possible second configuration of the system nodes according to a second game-theory algorithm; and
determining a resulting configuration of the system nodes in response to the identified at least one first and second configurations.

20. The method of claim 19, further comprising:
wherein identifying the at least one first configuration of the system nodes includes identifying that at least one first configuration as at least one Nash Equilibrium solution;
wherein identifying the at least one second configuration of the system nodes includes identifying the at least one second configuration as at least one MiniMax solution; and
determining the resulting configuration by
setting the resulting configuration equal to one of the at least one MiniMax solutions if no Nash Equilibrium solution is identified, and
if at least one Nash Equilibrium solution is identified, then
comparing each of the at least one Nash Equilibrium solutions to each of the at least one MiniMax solutions,
if each of the at least one Nash Equilibrium solutions equals a respective one of the at least one MiniMax solutions, and no other solutions exist, then setting the resulting configuration equal to one of the at least one existing solutions,
else, for each respective Nash Equilibrium solution and for each respective MiniMax solution
generating a matrix with the respective Nash Equilibrium solution the respective MiniMax solution,
applying the Nash Equilibrium algorithm to the matrix and returning a resulting solution if a resulting solution exists, and
if the resulting solution exists, then
optimizing the resulting solution according to a MaxiMin algorithm, and
setting the resulting configuration equal to the resulting solution.

21. A non-transitory computer-readable medium including instructions that, when executed by a computing apparatus, cause the computing apparatus to perform steps comprising:
identifying at least one possible first configuration of system nodes according to a first game-theory algorithm;
identifying at least one possible second configuration of the system nodes according to a second game-theory algorithm; and
determining a resulting configuration of the system nodes in response to the identified at least one first and second configurations.

* * * * *